May 18, 1965     M. KAYNAN     3,183,721
PROCESS FOR FORMING A THERMOMETER
Filed Dec. 17, 1962     2 Sheets-Sheet 1
FIG. 1
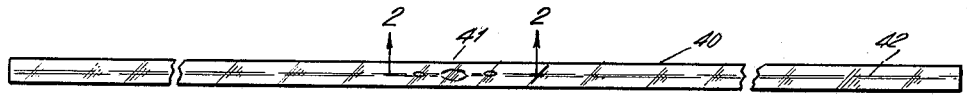
FIG. 2
FIG. 3
FIG. 4     FIG. 5
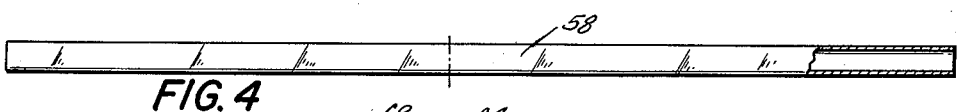
FIG. 6     FIG. 7
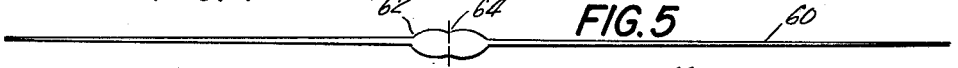
FIG. 8     FIG. 9
FIG. 10
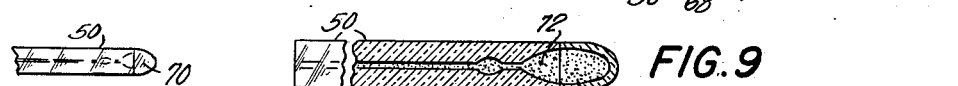
FIG. 11
FIG. 12
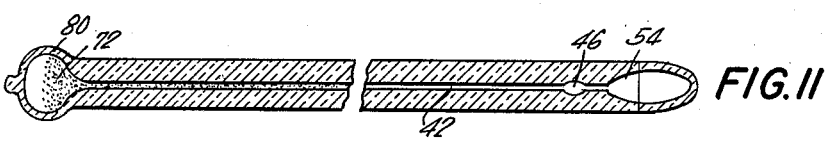
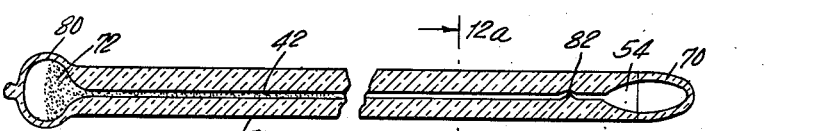
FIG. 12a
INVENTOR.
MARTIN KAYNAN
BY
ATTORNEYS May 18, 1965 M. KAYNAN 3,183,721
PROCESS FOR FORMING A THERMOMETER
Filed Dec. 17, 1962 2 Sheets-Sheet 2
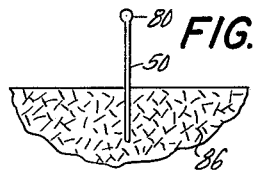
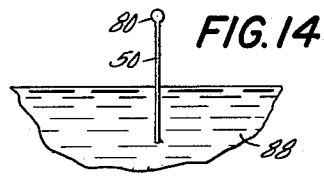
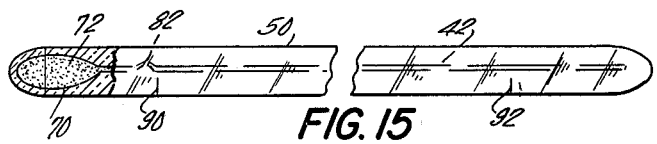
FIG. 15
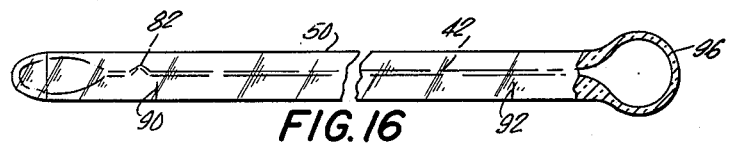
FIG. 16
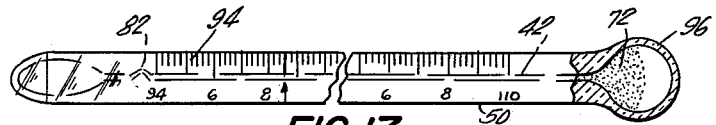
FIG. 17
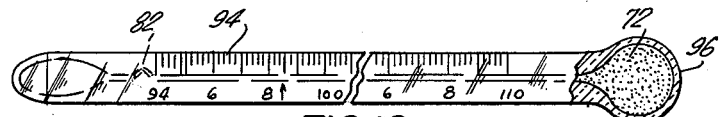
FIG. 18
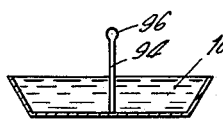
FIG. 19
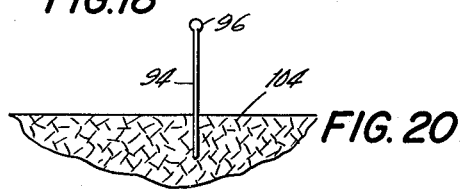
FIG. 20
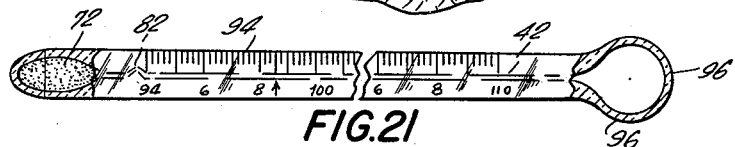
FIG. 21
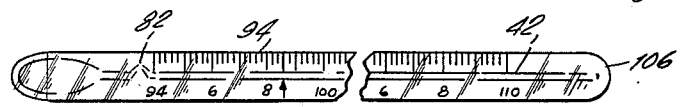
FIG. 22
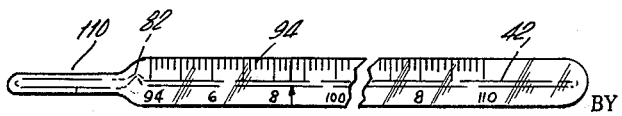
FIG. 23
INVENTOR.
MARTIN KAYNAN
BY
Briskin & Goldfarb
ATTORNEYS

United States Patent Office 3,183,721
Patented May 18, 1965

3,183,721
PROCESS FOR FORMING A THERMOMETER
Martin Kaynan, 1357 E. 86th St., Brooklyn 36, N.Y.
Filed Dec. 17, 1962, Ser. No. 245,299
4 Claims. (Cl. 73—371)

The present invention relates to the manufacture of glass thermometers and to a method of calibrating and marking various types of thermometers, including clinical thermometers.

A number of types of clinical or fever thermometers have been devised, which are either of the rectal or oral type, may be of any desired cross section, having an axial bore and each of which have at one end a thin-walled reservoir for mercury or other expansible fluid. The thermometers are made preferably of glass and the actual cross section of the thermometer is such that the shaft acts as a lens to magnify the capillary bore in which the liquid rises from the bulb upon application of heat.

In the manufacture of glass thermometers, it has been found desirable to anneal the glass shaft of the thermometers in order to reduce internal stresses and to thereby enable a more accurate calibration of the thermometers. It is a concept of the present invention to provide means for applying the markings on the thermometer without having to resort to the laborious process of inscribing glass markings or applying stained markings on the glass as heretofore done in the prior art. The present invention overcomes the disadvantages and time consumed of the former methods of applying markings by the concept of applying a decalcomania to the shaft of the thermometer at a suitable and precalibrated location so that during the annealing process or thereafter, the decalcomania may be baked on the shaft of the thermometer to provide accurate markings for indicating various temperatures to which the expansible fluid such as mercury is subject during use of the thermometer.

Markings produced by inscribing the glass shafts of thermometers normally act as focal points for breakage of the thermometer. The present invention obviates this disadvantage by providing a glass thermometer which is marked by a decalcomania fired or baked thereon, which decalcomania serves to reinforce the thermometer and render it somewhat shatterproof rather than to permit the inscribed markings of the prior art to act as focal points for breakage. Further, the present invention can be more easily wiped clean inasmuch as there are no grooves caused by the inscribed markings. The thermometer of the present invention can be sterilized through various media other than heat and the present invention will refrain from trapping dirt. Further, the markings of the present invention are permanent and non-subject to disturbing visibility through the shaft of the thermometer.

Various types of stain markings have heretofore been used, but these stain markings have proven to be non-permanent and in some few cases, there has found to be allergic reactions to the chemicals of the stain markings. In addition, it usually requires a considerably large expenditure of time and effort to properly apply stain markings in accordance with the calibration of the particular thermometer. The use of a decalcomania baked on the shaft of the thermometer in accordance with the present invention obviates these difficulties.

Still further objects of the present invention reside in the provision of a process for marking thermometers in which calibration indicia are provided in a clear, even, readily visible and attractive manner and in which various words and other information can be simultaneously applied to the shaft of the thermometer without requiring further steps and in which advertising indicia, names of hospitals, clinics, or organizations, such as the military forces can be applied to a thermometer without requiring any further steps in the process of the manufacture thereof and without increasing the cost of the thermometer.

These, together with the various ancillary objects and features of the invention, which will become apparent as the following description proceeds, are attained by this process of manufacturing and marking thermometers, the steps of the process being shown in the accompanying drawings, by way of example only, wherein:

FIG. 1 is a plan view of a length of clinical lens tubing which has been heated to form blisters and an opening;

FIG. 2 is a partial axial sectional detail view taken along the plane of line 2—2 in FIG. 1;

FIG. 3 is a view of the tubing after it has been cut in half;

FIG. 4 is a plan view of a length of normal tubing;

FIG. 5 is a plan view of the normal tubing after it has been drawn;

FIG. 6 is a plan view of the normal tubing after it has been cut in half to form swisters;

FIG. 7 is a plan view illustrating the procedure of forming the thermometer after the swister has been fused to the opening in the clinical lens tubing;

FIG. 8 is a plan view of the bulb formed by fusing the swister to the end of the clinical lens tubing having the opening therein;

FIG. 9 is an enlarged sectional detail view of a portion of the incomplete thermometer illustrating the bulb filled with mercury;

FIG. 10 is a sectional view illustrating the step of forming a head on the shaft of the thermometer opposite the bulb;

FIG. 11 illustrates the thermometer with the mercury being centrifuged into the head;

FIG. 12 illustrates the thermometer after the thermometer has been heated to collapse the blister into a constriction;

FIG. 12a is a transverse sectional view taken along the plane of line 12a—12a in FIG. 12;

FIG. 13 is a schematic view illustrating the step of cooling the thermometer;

FIG. 14 is a view showing immersion of the thermometer into a bath at a predetermined temperature;

FIG. 15 illustrates the step of the thermometer after the mercury has been centrifuged into the bulb;

FIG. 16 illustrates the thermometer after a safety chamber has been formed on the end of the shaft opposite the bulb;

FIG. 17 illustrates the step of placing a decalcomania on the shaft;

FIG. 18 illustrates the step of annealing the thermometer and baking the decalcomania on the shaft;

FIGS. 19 and 20 illustrate schematically the steps of immersing the thermometer in a heated bath and in ice respectively for calibration of the thermometer;

FIG. 21 illustrates the thermometer after the mercury has been centrifuged into the bulb prior to removal of the safety chamber;

FIG. 22 illustrates the completed thermometer after the safety chamber has been removed; and FIG. 23 illustrates a modified form of thermometer having a different shaped bulb.

With continuing reference to the accompanying drawings, wherein like reference numerals designate similar parts throughout the various views, reference numeral 40 generally designates, see FIG. 1, a length of Corning clinical lens tubing or the equivalent which is approximately nine inches long. At approximately the mid point 41 of this length of tubing 40, the glass is heated and compressed air is introduced into the capillary bore 42 until an initial opening or expansion 44, approximately one-eighth of an inch high by three-sixteenths of an inch long, is formed. Approximately three-sixteenths of an inch to each side of the initial expansion or opening 44 there is formed a pair of blisters 46 and 48 which are obtained by heating the glass with a needlepoint flame thereby expanding the capillary to form the blisters of approximately one-sixteenth of an inch in height by one-eighth of an inch in length. The tubing is then cut in half leaving two shafts 50 and 52 approximately four and one-half inches long, and leaving two half openings 54 and 56.

As shown in FIG. 4, a cane 58 of Corning normal tubing or its equivalent is heated at one end until it closes. While the glass is molten at this end, it is drawn to an outside diameter of approximately one one-hundredth of an inch. The point 60 at which the tubing has been drawn to approximately one one-hundredth of an inch is approximately six inches away from the unheated section of the normal tubing which usually has an outside diameter of seven-thirty-seconds of an inch. The tubing is then heated at the point 64 approximately one-quarter of an inch from where it resumes its seven-thirty-second inch outside diameter and stretched slightly reducing its outside diameter to three-sixteenths of an inch. It is then heated one-quarter of an inch further down on the normal tubing and drawn down at that point 62 until the outside diameter is one one-hundredth of an inch. The total length of this drawn section is approximately twelve inches. The section is then cut in half at the point 64 where the tubing has been drawn down to an outside diameter of three-sixteenths of an inch and there is thus formed two swisters 66 and 68.

As shown in FIG. 7, the swister 68 is fused to the opening end 54 of the shaft 50 and the tubing at 60 which has been drawn to an outside diameter of one one-hundredth of an inch is broken off thus forming a bulb 70. This bulb 70 is of a desired dimension and form. It is to be recognized that other shapes or forms of bulbs may be obtained through fusing onto the opening at 54 various shapes as desired and the bulbs themselves may be molten and shaped as further desired (see FIG. 8).

A quantity of partially-formed thermometers are placed in a vacuum system and after a thirty-inch vacuum is drawn, sufficient mercury 72 is introduced to completely fill the partially-formed thermometers as shown in FIG. 9.

The partially-formed thermometers are then subjected to scaling by being placed, bulbs down, in a controlled bath at a temperature of exactly 98° F. Excess mercury rising out of the open end of the glass opposite the bulb 70 is brushed away. The partially-formed thermometers are then placed in a controlled bath of 82° F. bulbs down. The distance between the point to which the mercury rises in the capillary and the open end of the thermometer is measured. A tolerance of from two to three inches is acceptable for further processing.

Acceptable partially-formed thermometers, as shown in FIG. 10, have their shafts 50 heated at the end opposite to the bulb 70 until the capillary closes. The bulb 70 is then heated to drive the mercury towards the heated closed end to expand the capillary to a size sufficient to contain all of the mercury, as shown in FIG. 11. The thermometers may then be placed in an electric centrifuge, bulbs up, and they are centrifuged until all of the mercury is in the head 80. Thereafter, as shown in FIG. 12, the blister 46 is collapsed to form a constriction 82, which is donut-shaped when viewed through the lens tubing, by heating the shaft of the thermometer adjacent the blister 46 until the constriction 82 is formed. This constriction 82 is sufficient to make the thermometer maximum registering, but not so as to make it too difficult to shake the mercury 72 down by hand.

Next, the partially-formed thermometers, which contain mercury 72 may be annealed by passing the thermometers into a zone of heat such as an oven at 860° F. and maintaining such temperature for approximately three hours. Thereafter, the partially-formed thermometers cool from that temperature at a rate not exceeding 100° F. per hour, so that the residual stress after cooling is preferably not in excess of ten pounds per square inch. Next, the partially-formed thermometers are centrifuged, bulbs down, until the bulbs are filled with mercury. They are then placed, bulbs down, in a bath of 100° F. Any mercury that rises about the constriction is shaken into the head by placing the thermometers, bulbs up, in a hand centrifuge and the partially-formed thermometers are then centrifuged slowly. This process is then repeated at 120° F., 130° F. and 140° F.

The thermometers are then placed, bulbs down, in a pan of water, and the pan of water is heated until the water boils. After the thermometers have cooled to room temperature, they are placed in chopped ice 86, bulbs down, as shown in FIG. 13, and remain there for at least one half hour. The thermometers are then centrifuged, bulbs down, so that all the mercury that went into the head while boiling is shaken into the bulbs.

The thermometers are then placed in a bath 88 of 50° F., bulbs down, and any mercury that rises above the constriction is shaken into the head as in the previous steps. This step is repeated at 60° F. and 70° F. and these steps are called "removing air."

The next step is to set the total scale of 94° F. to 110° F. within the prescribed tolerances. The setting of 98° F. between one inch to one and one-half inches from the constriction accomplishes this. Experience has shown that acceptable thermometers which measure from two inches to two and one-quarter inches are placed in a bath of 85° F. and centrifuged lightly, bulb up, will have remaining in the bulb the quantity of mercury necessary to rise up one inch to one and one-quarter inches above the construction at 98° F. The 85° F. temperature in this particular instance is called "letting out water."

The thermometers are then inspected at 98° F. They are centrifuged very lightly, bulb up, so as to have the mercury which rose above the constriction at 98° F. break away from the constriction. They are then heated at 106° F. and inspected to see that the mercury is not more than three and one-half inches from the tip of the bulb. During the 106° F. inspection, they are examined for air breaks in the mercury column.

Thereafter, the thermometers are centrifuged, bulbs down, and examined to see if the mercury shakes down to conform to the prescribed tolerances. The thermometers which have passed inspection are heated at a point which is three-sixteenths of an inch below the head and as shown in FIG. 16. The head is then removed. The thermometers are then placed in a controlled bath of 94° F. and marked with a water-resistant ink at the point where the mercury column ends in the capillary, such as the marking at 90. This is repeated at 110° F. and another marking 92 is provided where the mercury ends.

The end of the thermometer, see FIG. 16, from which the head was removed is heated and the bulb heated until the capillary at the end of the thermometer remote from the bulb 70 expands so as to be able to contain twice the volume of mercury in the thermometers. Decalcomanias are then applied at the proper points as indicated by the marks 90 and 92, the decals being shown at 94. The decalcomanias have marked thereon various indications as to temperatures, and may contain serial numbers and other indicia, such as names of hospitals, clinics, advertising or the like, all of which may be incorporated on the decals in a convenient manner. The thermometers are then placed in an oven which is designed to permit the shaft 50 to be raised to the annealing temperatures of the shaft while also baking in the decalcomanias and relieving all stresses in excess of ten pounds per square inch from the shafts. Further, the safety chamber 96, which has been formed on the end of the shafts, are insulated against these temperatures. The decalcomanias, extending partially around the shafts serve to reinforce the thermometers.

During baking of the decalcomanias, the thermometers are annealed. During such baking, the mercury in the bulb will expand and a quantity of it will travel to the safety chamber. This mercury will then be centrifuged back into the bulb after the thermometer has been cooled at a rate of approximately 100° F. per hour and after the thermometers have been cooled to room temperature. In some instances the earlier annealing step may be eliminated and only the concurrent annealing and baking in of the decalcomania employed. The thermometers are then processed to remove any air which may be in the bulb or constriction. This is accomplished by placing the thermometer in a pan of chopped ice, bulbs down. They are then placed in a pan of water, bulbs down, at 100° F. The bulbs are then centrifuged lightly, bulbs up, to remove the mercury above the constriction and to remove the mercury to the safety chamber. This is repeated at 110° F., 120° F., 130° F., 140° F., and 150° F.

The thermometers are, as shown in FIG. 19, placed in a pan of water 102 which is heated until the water boils. After the thermometers have cooled down to room temperature, they are placed in chopped ice 104, FIG. 20, bulbs down, for about ten minutes. They are then centrifuged, bulbs down, until the mercury that rose to the chamber while boiling is shaken into the bulb.

The thermometers are then certified by checking against National Bureau of Standards approved thermometers at 98° F., 102° F., and 106° F. Those thermometers which are acceptable are heated at a point four and one-sixteenth inches from the tip of the bulb and the safety chamber 96, shown in FIG. 21, is then removed to form a closed end as at 106, shown in FIG. 22. After the safety chambers have been removed, the thermometers are recertified at the aforementioned test temperatures. Those thermometers that are acceptable are ready for commercial distribution.

As seen in FIG. 23, in lieu of the bulb 70, bulbs of the shape 110 may be employed and bulbs of any other shape as desired may likewise be employed. The thermometers may have any desired cross section, either that shown in FIG. 12a or any other conventional cross sections as are used in thermometers.

Of course, the dimensions set forth in the specification are not to be considered as being limited but are only given as examples to enable one skilled in the art to carry out the invention.

A latitude of modification, substitution and change is intended in the foregoing disclosure, and in some instances, some features may be employed without a corresponding use of other features. Accordingly, it is appropriate that the appended claims be construed broadly and in a manner consistent with the spirit and scope of the invention herein.

I claim:
1. A process of manufacturing a glass thermometer and forming markings thereon comprising the steps of:
(a) providing a length of clinical lens tubing;
(b) heating the tubing at the midpoint thereof;
(c) introducing air into said tubing to form an opening and a pair of blisters adjacent said mid point;
(d) cutting said opening in half;
(e) fusing a swister to a cut end of said opening to form a bulb;
(f) introducing mercury into said bulb;
(g) raising said thermometer to the annealing temperature thereof;
(h) cooling said thermometer;
(i) heating the end of said shaft opposite said bulb to form a safety chamber;
(j) calibrating said thermometer;
(k) applying to a side surface of said shaft a decalcomania having graduations thereon;

(l) heating said thermometer by placing said shaft in an oven while insulating said safety chamber with said thermometer being raised to a temperature below the stress temperature of the glass and sufficient to bake in said decalcomania on said shaft;
(m) and then cooling said thermometer.

2. A process according to claim 1, including the steps of sealing said shaft, and then removing said safety chamber from said shaft.

3. A method of applying decalcomania markings to a glass thermometer comprising the steps providing a glass thermometer having a shaft with a capillary bore therein, a reservoir bulb at one end of said shaft, placing a heat expansible liquid in said bore and said bulb, applying a decalcomania to a side surface of said shaft, raising said entire thermometer to the annealing temperature of the glass, cooling said thermometer at a rate low enough so that the thermometer has a residual stress not in excess of ten pounds per square inch, forming an expansion chamber in communication with the other end of said shaft, applying to three side surfaces of the thermometer a decalcomania having graduations thereon, heating said thermometer by placing said shaft in an oven while insulating said safety chamber with said thermometer being raised to a temperature below the stress temperature of the glass and sufficient to bake in said decalcomania on said shaft, and then cooling said thermometer.

4. A process of manufacturing a glass thermometer and forming markings thereon comprising the steps of:
(a) providing a length of clinical lens tubing;
(b) heating the tubing at the mid point thereof;
(c) introducing air into said tubing to form an opening and a pair of blisters adjacent said mid point;
(d) cutting said opening in half;
(e) fusing a swister to a cut end of said opening to form a bulb;
(f) introducing mercury into said bulb;
(g) forming a top chamber opposite the bulb;
(h) centrifuging mercury from the bulb into said top chamber;
(i) forming a constriction in said tubing;
(j) raising said thermometer to the annealing temperature thereof;
(k) cooling said thermometer;
(l) setting scale and calibrating said thermometer;
(m) removing the top chamber;
(n) heating the end of said tubing opposite said bulb to form a safety chamber;
(o) applying to the three surfaces of said tubing a decalcomania having graduations and indicia thereon;
(p) heating said thermometer by placing in an oven while insulating said safety chamber with said thermometer being raised to a temperature below the stress temperature of the glass and sufficient to bake in said decalcomania;
(q) and then cooling said thermometer.

References Cited by the Examiner
UNITED STATES PATENTS

| | | | |
|---|---|---|---|
| 626,124 | 5/99 | Yankauer | 73—371 |
| 1,540,264 | 6/25 | Henry | 65—117 |
| 2,706,761 | 4/55 | Douglas | 73—371 |

FOREIGN PATENTS
2,027 2/85 Great Britain.

OTHER REFERENCES
Handbook of Glass Manufacture, Ogden Publishing Co., 1953 (page 399 relied on).

ISAAC LISANN, Primary Examiner.
ROBERT L. EVANS, Examiner.